US006893555B2

(12) United States Patent
Roper et al.

(10) Patent No.: US 6,893,555 B2
(45) Date of Patent: May 17, 2005

(54) DUAL FLOW FILTER

(76) Inventors: Alan Philip Roper, Wayside, Dereham Road, Garveston, Norwich (GB), NR9 4QT; Michael Charles Fallows, Greenways, Leabrooks Road, Somercotes, Alfreton, Derbyshire (GB), DE55 4HB ( * ) Notice: Subject to any disclaimer, the term of this patent is extended or adjusted under 35 U.S.C. 154(b) by 14 days.

(21) Appl. No.: 10/203,727

(22) PCT Filed: Feb. 15, 2001

(86) PCT No.: PCT/GB01/00605

§ 371 (c)(1),
(2), (4) Date: Oct. 15, 2002

(87) PCT Pub. No.: WO01/60495

PCT Pub. Date: Aug. 23, 2001

(65) Prior Publication Data

US 2003/0168397 A1 Sep. 11, 2003

(30) Foreign Application Priority Data

Feb. 19, 2000 (GB) .............................................. 0003816

(51) Int. Cl.$^7$ .............................................. B01D 29/54
(52) U.S. Cl. ..................... 210/136; 210/316; 210/317; 210/352; 210/428; 210/440; 210/455; 210/493.1; 210/496; 210/DIG. 13; 210/DIG. 17
(58) Field of Search ................................ 210/316, 317, 210/350, 352, DIG. 13, 136, 168, 253, 314, 323.1, 428, 440, 443, 444, 455, 456, 493.1, 496, DIG. 17

(56) References Cited

U.S. PATENT DOCUMENTS

| 2,406,308 A | * | 8/1946 | Stokes et al. ................ 210/131 |
| 2,929,506 A | * | 3/1960 | Belgarde ...................... 210/315 |
| 3,586,171 A | * | 6/1971 | Offer ............................ 210/136 |
| 4,036,755 A | * | 7/1977 | Dahm et al. ................. 210/168 |
| 4,738,776 A | * | 4/1988 | Brown ......................... 210/168 |
| 5,217,606 A | * | 6/1993 | Ramponi et al. ............ 210/136 |
| 5,698,097 A | * | 12/1997 | Gebert et al. ................ 210/248 |

FOREIGN PATENT DOCUMENTS

| EP | 341349 A2 | * | 11/1989 | ........... B01D/27/00 |
| EP | 362554 A1 | * | 4/1990 | ........... B01D/27/10 |
| EP | 558828 A1 | * | 9/1993 | ........... B10D/27/06 |

* cited by examiner

Primary Examiner—Matthew O. Savage
(74) Attorney, Agent, or Firm—Andrus, Sceales, Starke & Sawall, LLP

(57) ABSTRACT

A dual flow filter unit for the filtration of a pressurized liquid such as oil, comprising a closed housing (10) having an inlet (31), and main and secondary outlets (32, 13) for that liquid. The unit further comprises a main filter element (21) arranged in the housing (10) and having an unfiltered fluid surface exposed to the majority of the liquid flow, the flow through the main filter (21) being directed to the main outlet (32) from the housing (10); and a secondary filter element (17) exposed to a portion of the liquid flow supplied to the housing inlet (31), any flow through the secondary filter being directed to the secondary outlet (13) from the housing. The main filter element (21) offers a low resistance to the flow of fluid therethrough relative to the secondary filter element (17) so that the majority of the flow through the inlet (31) is filtered by the main filter element (21) and the remainder by the secondary filter element (17). This allows better filtration of the liquid without adversely affecting the flow rate or pressure thereof.

10 Claims, 3 Drawing Sheets

DUAL FLOW FILTER

CROSS-REFERENCE TO RELATED APPLICATIONS

This application is the U.S. national stage application of International Application PCT/GB01/00605, filed Feb. 15, 2001, which international application was published on Aug. 23, 2001 as International Publication WO01/60495 in the English language. The International Application claims priority of Great Britain Patent Application 0003816.6, filed Feb. 19, 2000.

This invention relates to filter units for filtering liquids. The present invention is particularly suited for filtering oils, spirits, chemicals and water, but is not exclusively limited to use with these liquids. The present invention finds a particular application in automotive oil filters.

Conventional filter technology generally operates on one of two bases; namely either full flow filtration or bypass/dialysis filtration. A fundamental difference between the two technologies concerns the particle size which can be removed from the liquid to be filtered, for a given filter size and flow capacity.

Full flow filtration subjects the total liquid flow (for example the output from a pump) to filtration, but to ensure adequate liquid flow and operating pressure, the filter cannot impose too great a restriction on the flow, and so cannot remove very small particles unless the filter is impracticably large and out of proportion to the equipment with which it is used, such as an internal combustion engine. In the case of an engine, a full flow oil filter element typically removes particles larger than 25 $\mu$m diameter, without incurring undue restriction to the flow, or too great a reduction in the pressure downstream of the filter, which otherwise could lead to the premature mechanical breakdown or seizure of working parts of the engine. An attempt to use a filter media capable of containing smaller particles could create too great a flow restriction, unless a very large-sized filter is used. However, the size of the filter to be used and its cost are major considerations, in designing a cost efficient filtration system.

Conversely, bypass/dialysis filter technology is designed to remove smaller particles (typically down to diameters of 1 $\mu$m) but the filter element imposes a greater restriction on the flow than with a full flow filter. Thus, a bypass/dialysis filter could impose too great a restriction were the filter installed to accept the full flow from, for example, the lubricating pump of an engine. Therefore, such a filter is fitted to a fluid system in such a way that only a portion of the fluid circulating in a system passes through the filter, the remainder being able to by-pass the filter. In addition, a by-pass system can remove foreign liquid matter that has contaminated the fluid in the system. In order to achieve these advantages, a bypass filter may be constructed from tightly packed or wound dense material, which forms a restriction against the flow of the fluid in the system to which it is attached.

It is an object of the present invention to provide a single filter device that is capable of combining the functionality of a full flow filter and that of a bypass/dialysis filter. Such a filter device should improve the efficiency of the removal of contamination from the fluid being filtered. In the context of an internal combustion engine this will decrease wear, and pollution as a consequence.

Therefore according to the present invention there is provided a filter unit for the filtration of a pressurised liquid comprising:

a closed housing having an inlet for liquid to be filtered, and main and secondary outlets for liquid which has been filtered;

a main filter element arranged in the housing and having an unfiltered fluid surface exposed to the majority of the liquid flow supplied under pressure to the housing inlet, flow through the main filter being directed to the main outlet from the housing;

a secondary filter element having an unfiltered fluid surface exposed to a portion of the liquid flow supplied under pressure to the housing inlet, flow through the secondary filter being directed to the secondary outlet from the housing;

wherein the main filter element offers a low resistance to the flow of fluid therethrough relative to the secondary filter element so that the majority of the flow through the inlet is filtered by the main filter element and the remainder by the secondary filter element.

From the point of view of ease of construction, as well as because it would be convenient in many of the envisaged applications of the present invention, it is preferred that the housing is substantially cylindrical, with a one end and an other end. It is of course possible to use other housing shapes, but a cylindrical shape is both efficient in its use of space, and also convenient to produce by moulding or pressing.

Advantageously the inlet and main outlet are formed in the one end of the housing. It is more advantageous that a number of inlets are provided and that these are radially disposed around the one end of the housing. It is desirable to provide the second outlet on the other end of the housing.

It is beneficial if the main filter element is located adjacent the one end of the housing and is cylindrical with a diameter slightly less than the housing, and the unfiltered fluid surface thereof being disposed toward the curved surface of the housing. This is because the liquid filtered by the main filter element passes out of the main outlet, which as mentioned above is advantageously formed in the one end.

With the main filter element located adjacent the one end, it is preferred that the secondary filter element is adjacent the other end of the housing.

For construction purposes the filter unit may have a housing which is open and subsequently is sealed. This permits the inclusion of all the internal parts, and then the subsequent closure of the housing. Preferably, the one end of the housing is formed from an end cap, which may be permanently connected to the housing during manufacture, or alternatively may be removably connected thereto to allow servicing of the filter elements or other components. Servicing of the filter elements could include replacing either or both of the filter elements, or perhaps washing the filters clean.

Generally, as they are widely used and cheap to manufacture, it is preferred that the main filter element is a pleated or folder paper filter. Such filters are already in substantial use for example as engine oil filters. The secondary filter element may be formed from compressed fibres such as cellulose fibre, wood pulp, polypropylene and polyester.

It may be preferred to provide a metering jet in the secondary outlet. This is because it may be necessary to limit the flow out of the second outlet to ensure the system operates at the correct pressure and flow rate.

To hold them apart and to form an inner chamber within the container it is preferred that a biasing spring is provided between the main filter element and the secondary filter element.

As mentioned above, in certain circumstances, it is desirable to fit a removable end cap, for example to permit servicing of the filter elements. It is however, within the scope of the invention to produce a filter unit that is completely sealed and is not serviceable. Such a unit could still be formed from a housing with an open end, which end is sealed during manufacture, but no normal access to the filter elements would be possible and the entire unit would be replaced as and when appropriate.

Filter units according to the present invention can simultaneously remove both liquid and solid contamination from a liquid system to which they are attached. Consequently, filters according to the present invention are capable of controlling the cleanliness level of a liquid, in the true sense and meaning of the word.

By way of example only the present invention will now be described in detail with reference to the accompanying drawings in which.

The filter unit will be described with reference to its use for filtering oil in an engine, but its use is not limited to such an application. Using current practices incorporating spin on replaceable filter units and components, the arrangement is constructed as follows.

Figure 1:
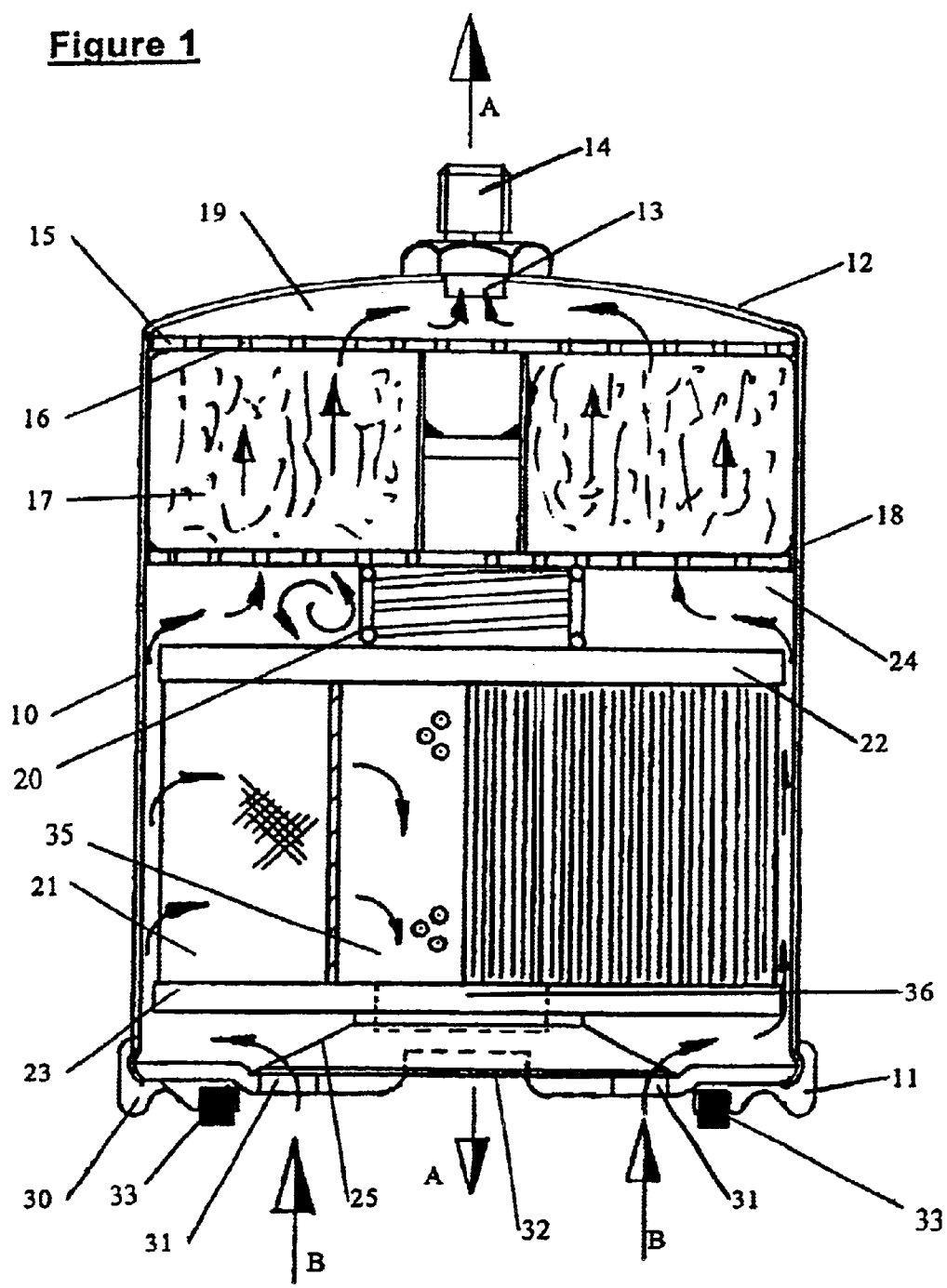
FIG. 1 is a cross section through one embodiment of filter unit according to the present invention.

Referring to FIG. 1 a filter unit having a housing 10 constructed from. 25 gauge 0.020" sheet steel (or, for high pressure fluid systems 19 gauge 0.040" sheet steel can be used) is shown. The housing is cylindrical in shape and open at one end 11. The closed other end 12 is dome-shaped and has a drain hole 13 formed through the centre thereof. The drain hole 13 is the second outlet, and has a compression fitting 14 which acts as a flow restrictor (necessary in applications where the design pressure and flow rate of fluids must be maintained) attached thereon, which fitting also allows connection of a separate oil pipe (not shown). The arrangement is assembled as follows.

A perforated metal support disc 15 approximately 1.0 mm thick is placed inside the housing adjacent the other end thereof defining a chamber 19. The perforations 16 in the disc should be no larger than about 2 mm, and their distribution should be sufficient to permit adequate flow. The support disc 15 supports the secondary filter element 17 which in this example is a compressed fibre filter. This secondary filter element 17 is a tight fit in the cylinder so that oil may not pass around. A second perforated support disc 18 is located against, and holds in place, the secondary filter element 17.

A compression spring 20 is disposed between the second support disc and a main filter element generally indicated 21 which is also contained within the housing 10. The load rate for this spring is approximately 20 lbs and the main filter element is a cylindrical pleated paper filter. The main filter element 21 is generally cylindrical in shape and has a first end 22 which abuts on the spring 20, and a second end 23 which is disposed toward the open end 11 of the housing 10. The spring 20 forms an inner separation chamber 24 between the two filter elements 17 and 21. A rubber seal 25 is fitted on the second end 23 of the main filter element 21.

A cap 30 is fitted to the open end 11 of the housing 10 and forms a leakproof seal therewith. The rubber seal 25 on the second end 23 abuts on the inside face of the cap and forms a seal therewith. The cap 30 has a number of radially disposed inlets 31, through which oil enters from the oil system to which the device is connected. A main outlet 32 is formed in approximately the centre of the cap 30. The rubber seal 25 acts as a barrier between the inlets 31 and the main outlet 32 to prevent oil from immediately exiting the unit bypassing both filter elements, without being filtered. A radial seal 33 is provided on the outside face of the cap 30 to allow a seal to be formed when connecting the device to an oil system.

The main filter element 21 has a pleated paper filter arranged between the two ends 22 and 23 and a space 35 into which oil passes once filtered. The space 35 communicates, through an opening 36 in the second end 23 with the main outlet 32.

In use, liquid (in this case oil) passes through the unit as indicated by the arrows. The arrows marked A indicate flow of oil into the unit, those marked B indicate flow out of the unit and those unmarked indicate flow through the unit. The unit works as follows. Oil enters the housing 10 through inlets 31 in the cap 30. It passes round the outside of the main filter element 21 filling the internal chamber 24. To maintain the system's intended flow rate, most of the oil passes through the main filter element 21 and enters the space 35. In so doing, any solid material larger than about 25 μm is trapped within the pleats of the main filter element 21. This oil then passes back out of the housing 10 to return to normal use through the main outlet 32. Usually, threaded mountings are provided for connection of the oil system to the outlets and/or inlets. The rubber seal 25 acts as a non return valve for the in-flowing oil and stops the oil from bypassing both filter elements.

The unit works under pressure and so the oil contained within the housing 10 is pressurised. The pressure forces the oil that does not pass through the main filter element 21 to pass instead through the perforations in the second support disc 18 and then through the secondary filter element 17. The secondary filter element 17 is able to remove solid particles far smaller than the 25 μm lower limit of the main filter element. In addition, it can also remove extraneous liquid such as water, contaminating the oil. The oil, once passed through the perforations 16 in the first support disc 15, enters the chamber 19. From there it exits the housing 10 through secondary outlet 13. Fitted to secondary outlet 13 is a compression fitting 14 which also acts as a flow restrictor. The oil passes through the flow restrictor and returns to a reservoir or tank, via a hose (none of which are shown) connected between the flow restrictor 14 and any suitable return point on the reservoir or tank.

In general the present invention will be in the form of a sealed unit in which the entire housing 10 and all the contents are periodically replaced. It is however possible to provide a housing and cap that may be removably interconnected to permit periodic servicing of old or clogged filter elements.

Figure 2:
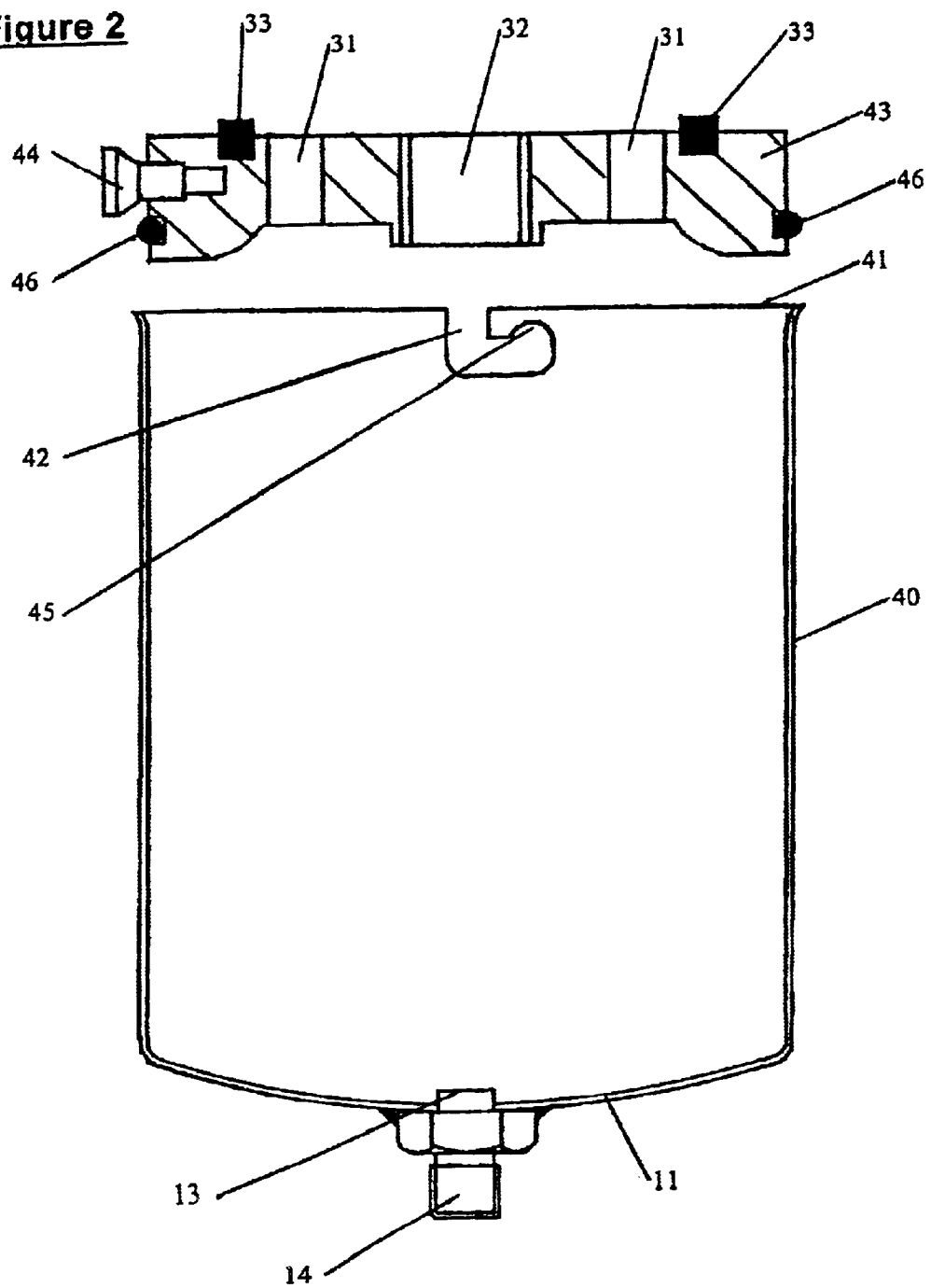
FIG. 2 is a cross section through a different but similar embodiment of the housing of the present invention.

FIG. 2 shows an alternative second embodiment of housing 40, the housing being identical to that shown in FIG. 1 (numbered 10), except at the open end 41. For ease of reference like parts will be given like reference numerals.

On the housing 40 a cut-out 42 is formed, allowing a bayonet type connection between housing 40 and the cap 43. A lug 44 on the cap is locatable in the cut-out 42 and after rotation is held in the locating part 45 by the upward (with respect to this diagram) force from the spring 20 (not shown in FIG. 2). At least one other similar lug and cut out would be located on the open end of the housing. A circular seal 46 on the cap 43 ensures suitable integrity of the seal between the cap 43 and the housing 40. As in FIG. 1 the cap has inlets 31 and a main outlet 32. In addition, the one end 11 of the housing is provided with a secondary outlet 13 to which a flow restrictor 14 is attached.

Figure 3:
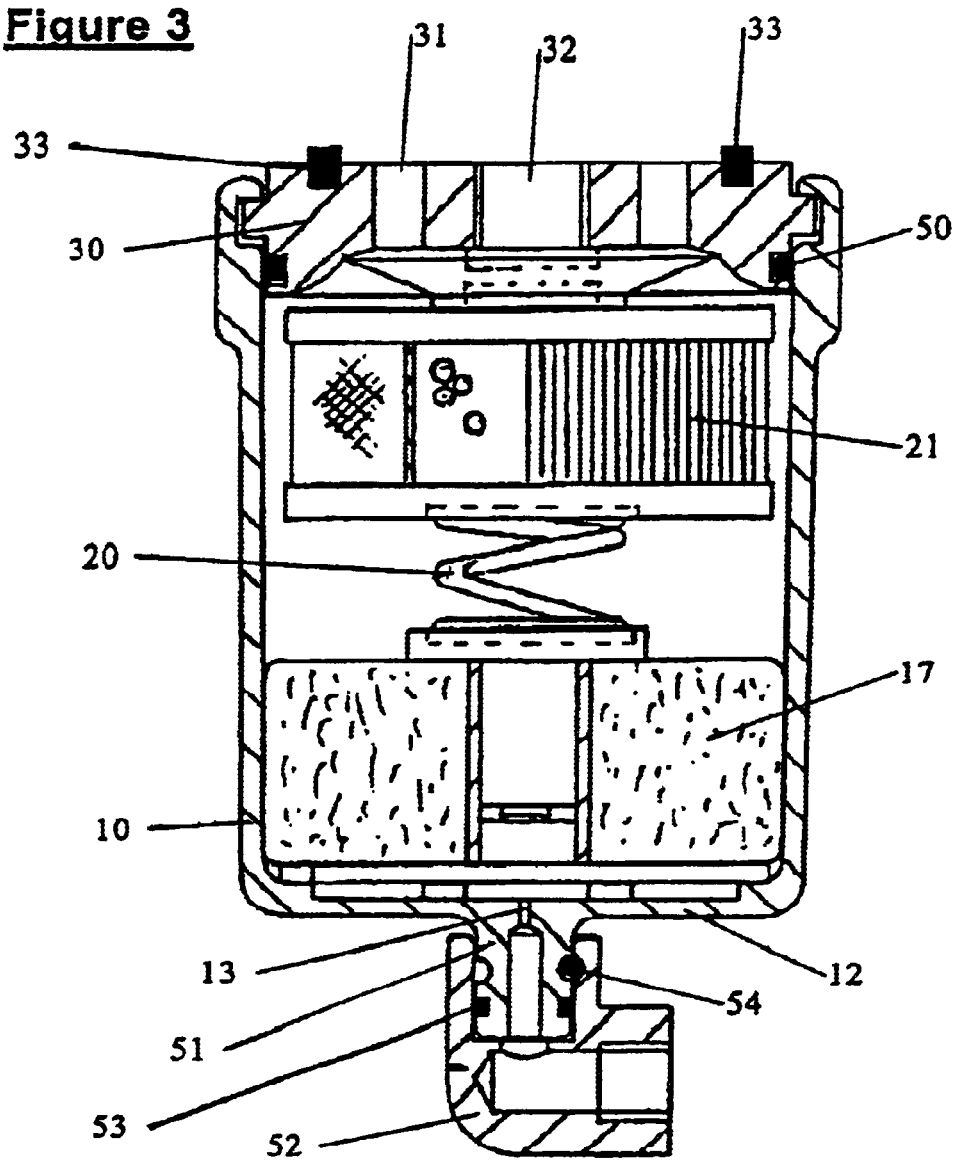
FIG. 3 is a cross section of a third embodiment of the present invention similar to FIG. 1.

FIG. 3 shows a third embodiment of the present invention that is similar to that shown in FIG. 1. For convenience, like parts will be given like reference numerals. A sealing ring 50 is provided on the cap 30 to ensure a fluid-tight joint with the housing 10.

The closed end 12 of the housing has a spigot 51 through which is formed the drain hole 13 (the secondary outlet), and which in use is attached to a swivel connector 52. A sealing O-ring 53 is provided to ensure the integrity of the joint, and a pin 54 is used to hold the spigot into the swivel connector 52. Oil that has passed through the secondary filter element 17 exits the housing 10 through the drain hole 13 and then enters a tube (not shown) attached to the swivel connector, and returns to the oil system as discussed above.

For illustrative purposes only, possible constructions of main filter element and secondary filter element are discussed below. The main filter element comprising:

Perforated support tube. 19 swg mild steel 56 perforations per square inch;

Filter media. Cellulose fibre sheet 0.020" thick. 70 pleats of dia, 12 pleats per linear inch. 25 micron porosity, coated with acrylic binder for strengthening purposes;

End caps. 25 swg 0.020" mild steel pressings;

Non return valve/seal rubber;

Pressure relief valve (optional feature not shown in accompanying drawings); and, Heat activated bonding agents used for final assembly of components.

The secondary filter element, being a compressed fibre filter could comprise:

Base weave—cellulose fibre;

Wood pulp 60%; (Swedish pine 45%;)

Polypropylene 17%; and

Polyester 23%;

The present invention could be constructed from a variety of materials, particularly pressed steel. In many applications, it may be preferred to construct it predominantly from plastics material because such material is light, durable and cheap. The filter media would not normally be constructed from plastics, but the remainder of the device could be made therefrom.

What is claimed is:

1. A filter unit for the filtration of a pressurized liquid comprising:

a closed housing made from a plastic material with a one end and an other end;

an inlet for liquid to be filtered and a main outlet for liquid which has been filtered, each formed in the one end of the housing;

a second outlet for liquid which has been filtered formed at the other end of the housing which second outlet is adapted for attachment to a return pipe;

a main filter element arranged in the housing and having an unfiltered fluid surface exposed to the majority of the liquid flow supplied under pressure to the housing inlet, flow through the main filter being directed to the main outlet from the housing;

a secondary filter element having an unfiltered fluid surface exposed to a portion of the liquid flow supplied under pressure to the housing inlet, flow through the second filter being directed to the secondary outlet from the housing;

wherein the main filter element offers a low resistance to the flow of fluid the relative to the secondary filter element so that the majority of the flow through the inlet is filtered by the main filter element and the remainder by the secondary filter element;

wherein the housing is generally cylindrical, the main filter element is adjacent the one end of the housing and is cylindrical with a diameter slightly less than the housing, and the unfiltered fluid surface thereof is disposed toward the curved surface of the housing; and wherein the housing is a sealed unit and the entire filter unit is replaceable.

2. A filter unit as claimed in claim 1, wherein the secondary filter element is adjacent the other end of the housing.

3. A filter unit as claimed in claim 1, wherein the one end of the housing is formed from an end cap.

4. A filter unit as claimed in claim 3, wherein the end cap is removably connected to the housing to allow servicing of filter elements.

5. A filter unit as claimed in claim 4, wherein the main and secondary filter elements may be replaced individually.

6. A fitter unit as claimed in claim 1, Wherein the main filter element is a pleated paper filter.

7. A filter unit as claimed in claim 1, wherein the secondary filter element is a compressed fiber filter.

8. A filter unit as claimed in claim 1, wherein a metering jet is provided in the second outlet.

9. A filter as claimed in claim 1, wherein a non-return valve is provided in the inlet.

10. A filter unit as claimed in claim 1, wherein a biasing spring is provided between the main filter element and the secondary filter element, which spring holds them apart to form an inner chamber within the housing.

* * * * *